(12) United States Patent
Strong

(10) Patent No.: US 6,659,526 B2
(45) Date of Patent: Dec. 9, 2003

(54) CANOPY AND VISOR WINDSHIELD FOR A MOBILITY VEHICLE

(75) Inventor: Russell W. Strong, Craftsbury Common, VT (US)

(73) Assignee: Integrated Vision, Inc., Craftsbury Common, VT (US)

( * ) Notice: Subject to any disclaimer, the term of this patent is extended or adjusted under 35 U.S.C. 154(b) by 9 days.

(21) Appl. No.: 10/156,311

(22) Filed: May 28, 2002

(65) Prior Publication Data

US 2002/0175534 A1 Nov. 28, 2002

Related U.S. Application Data

(60) Provisional application No. 60/324,145, filed on Sep. 21, 2001, and provisional application No. 60/293,877, filed on May 25, 2001.

(51) Int. Cl.[7] ................................................ B62D 25/06
(52) U.S. Cl. ............................... 296/96.13; 296/96.18; 296/96.2
(58) Field of Search ............................ 296/84.1, 90, 92, 296/96.12, 96.13, 96.18, 96.2, 77.1, 78.1, 79, 96.21, 201, 107.16, 107.02, 107.17, 25, 26.04, 26.05, 216.02

(56) References Cited

U.S. PATENT DOCUMENTS

| | | | | |
|---|---|---|---|---|
| 1,544,585 A | * | 7/1925 | Maurer | |
| 1,652,638 A | * | 12/1927 | Proctor | |
| 1,746,556 A | * | 2/1930 | Peston | |
| 2,088,200 A | * | 7/1937 | Glick | |
| 2,919,155 A | * | 12/1959 | Williams et al. | |
| 4,389,057 A | * | 6/1983 | Richard, Jr. | |
| 4,632,448 A | * | 12/1986 | Yagasaki et al. | 296/78.1 |
| 5,961,175 A | * | 10/1999 | Clardy, Jr. | 296/102 |
| 6,402,225 B1 | * | 6/2002 | Hsia | 296/107.02 |

FOREIGN PATENT DOCUMENTS

EP 0 444 558 A2 * 2/1991

* cited by examiner

Primary Examiner—Joseph D. Pape
(74) Attorney, Agent, or Firm—Artz & Artz, PC

(57) ABSTRACT

An environmental enclosure device for a vehicle includes a passenger compartment formed therein for receipt of an occupant. The device includes a roof portion disposed substantially over the passenger compartment to protect the occupant seated therein from undesirable weather elements or conditions. The device also includes at least one transparent portion extending generally downwardly from the roof portion toward the vehicle such that a space remains between the vehicle and a bottom edge of the transparent portion to allow the occupant to interface with fresh air elements of the outdoors while the enclosure device is in a closed position.

32 Claims, 3 Drawing Sheets

CANOPY AND VISOR WINDSHIELD FOR A MOBILITY VEHICLE

CROSS-REFERENCE TO RELATED APPLICATIONS

The present invention claims priority from U.S. Provisional Application Serial No. 60/324,145, entitled "Canopy and Visor Windshield For A Mobility Vehicle," filed Sep. 21, 2001; and U.S. Provisional Application Serial No. 60/293,877, entitled "Floor Closure For Assisted Entry Vehicle," filed May 25, 2001.

TECHNICAL FIELD

The present invention relates generally to a weather protection device for a vehicle. More specifically, the present invention relates to a environmental protection device for a mobility vehicle.

BACKGROUND OF THE INVENTION

Conventional vehicles, as are well known, have passenger compartments that are typically surrounded by glass or the frame of the vehicle, such as A-pillars, a B-pillars, and a roof. These structures of the vehicle are intended to provide protection and safety for the occupants, particularly since these vehicles are driven at high speeds adjacent other vehicles. Further, the glass in the form of the windshield and the windows are intended to allow the occupant or operator to experience the outdoors by providing a visual line of sight from the interior of the vehicle to the exterior of the vehicle. While the occupant or operator can roll down the windows to allow some interaction with the outdoors, the occupant is still surrounded by the vehicle.

To enhance an operator's or occupant's interaction with the outdoors while operating or riding in a vehicle, convertible tops have been developed. The convertible tops can be moved from a closed position, such as when the operator needs protection from weather elements, to an open position to allow the operator to enjoy the outdoors while operating the vehicle. While convertibles improve the operator's ability enjoy the outdoors, the transparent windshield which fully extends from the vehicle body to the roof line limits the operator's interface with the outdoors. Similarly, the front portion of the vehicle limits the operator's line-of-sight to the areas adjacent the front of the vehicle, which further limits the operator's ability to interface with the outdoors. Moreover, most convertible vehicles are not intended for off road travel and thus the operator's outdoor interface is limited to travel on highways, streets, and roads.

As is also known, four wheel drive vehicles have been produced in the past that have a front windshield that can be folded down in conjunction with a convertible top in order to maximize the outdoor experience. This configuration still, however, leaves the folded down windshield in front of the operator or occupant thereby still restricting forward interaction with the outdoors. While there have been forward opening windshield/doors in the past, as in an early BMW design, the designs as such do not provide outdoor interface while operating or a significantly open environment to the operator or occupant when parked.

Vehicles that are intended principally for off road travel, such as all terrain vehicles ("ATVs"), have been developed. These vehicles, however, are more akin to motorcycles in method of operator use, but have four low pressure wheels to accommodate off road travel. These vehicles allow an operator to interface with the outdoors. However, they do not have any weather protection device that is intended to shield the operator from the elements when weather conditions are poor.

It would thus be desirable to provide an environmental enclosure device for a vehicle that allows an operator improved interface with the outdoors during operation of the vehicle, and further readily enhanced interface with the outdoors when parked.

SUMMARY OF THE INVENTION

It is therefore an object of the present invention to provide an environmental enclosure device for a vehicle that provides weather protection for an operator seated therein.

It is another object of the present invention to provide an environmental enclosure device for a vehicle having all terrain capabilities that is designed to maximize operator interface with the outdoors.

It is a further object of the present invention to provide an environmental enclosure device for a vehicle that is readily removable by an operator as desired to provide further interface with the outdoors with use of the vehicle when weather protection is not desired or needed.

It is still another object of the present invention to provide an environmental enclosure device for a vehicle that can be readily moved from an open position to a closed position by an operator.

It is still a further object of the present invention to provide an environmental enclosure device for a vehicle that when opened with the vehicle parked, fully unobstructs the operator's view and peripheral view of the outdoors for maximum interface with the outdoors environment, yet still provides a level of weather related shielding.

It is yet another object of the present invention to provide an environmental enclosure device for a vehicle that provides optimal interface with the outdoors for an operator while also providing protection from direct contact with weather elements.

It is yet a further object of the present invention to provide an environmental enclosure device that utilizes an upwardly extending floor segment that, similar in nature to the effect of the roof and transparent portion's weather protection, is moved in position to effectuate protection from the road environment while closed and full interface with the outdoors when open.

It is still yet a further object of the present invention to provide an environmental enclosure device for a vehicle that is light weight and simple to operate.

It is still a further object of the present invention to provide an environmental enclosure device for a vehicle that performs its function without the necessity for complete environmental sealing of the operator area.

In accordance with the above and the other objects of the present invention, an environmental enclosure device for a vehicle is provided. The vehicle includes a passenger compartment formed therein for receipt of an occupant. The device includes a roof portion disposed substantially over the passenger compartment to protect the occupant seated therein from undesirable weather elements or conditions. The device also includes at least one transparent portion extending generally downwardly from the roof portion toward the vehicle such that a space remains between the vehicle and a bottom edge of the transparent portion to allow the occupant to interface with fresh air elements of the outdoors while the enclosure device is in a closed position.

Other objects and features of the present invention will become apparent when viewed in light of the detailed

DETAILED DESCRIPTION OF THE PREFERRED EMBODIMENT

Figure 1:
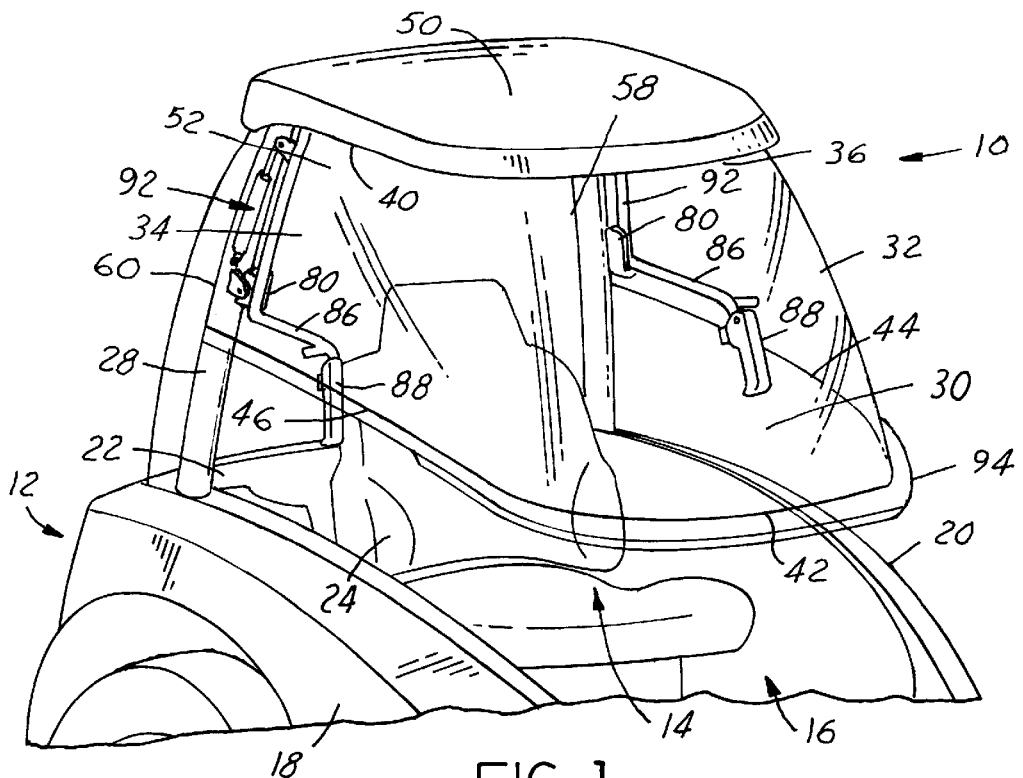
FIG. 1 is a perspective view of an environmental enclosure module for a personal mobility vehicle in accordance with a preferred embodiment of the present invention.
Figure 2:
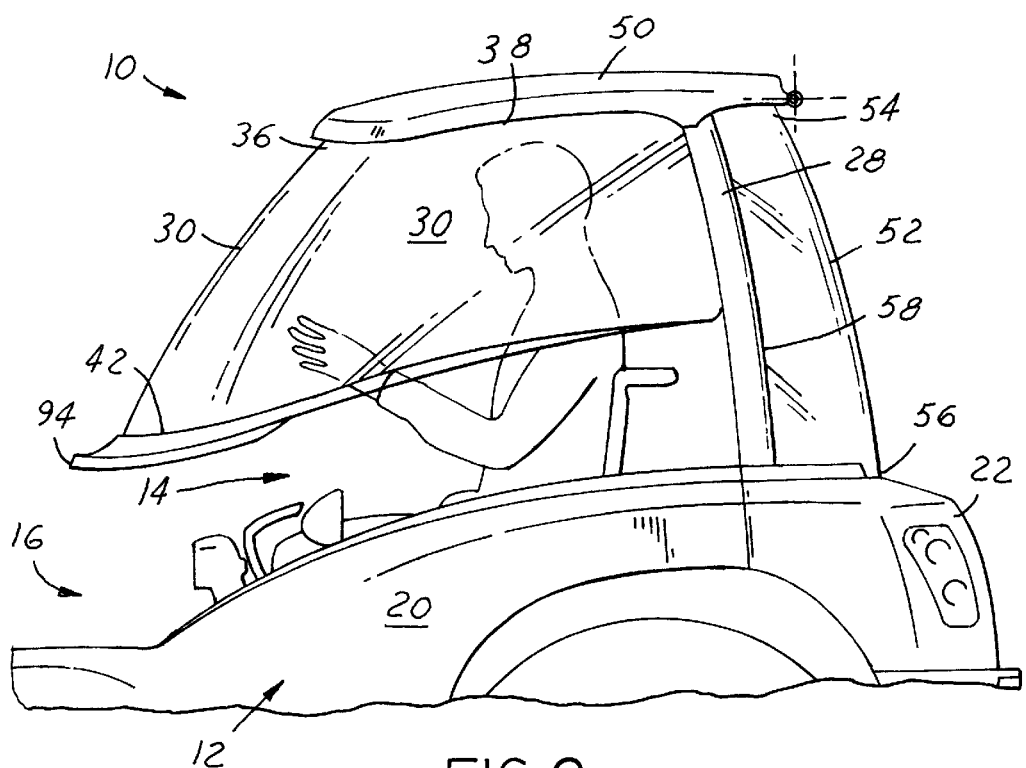
FIG. 2 is side view of an environmental enclosure module for a personal mobility vehicle in accordance with a preferred embodiment of the present invention.
Figure 3:
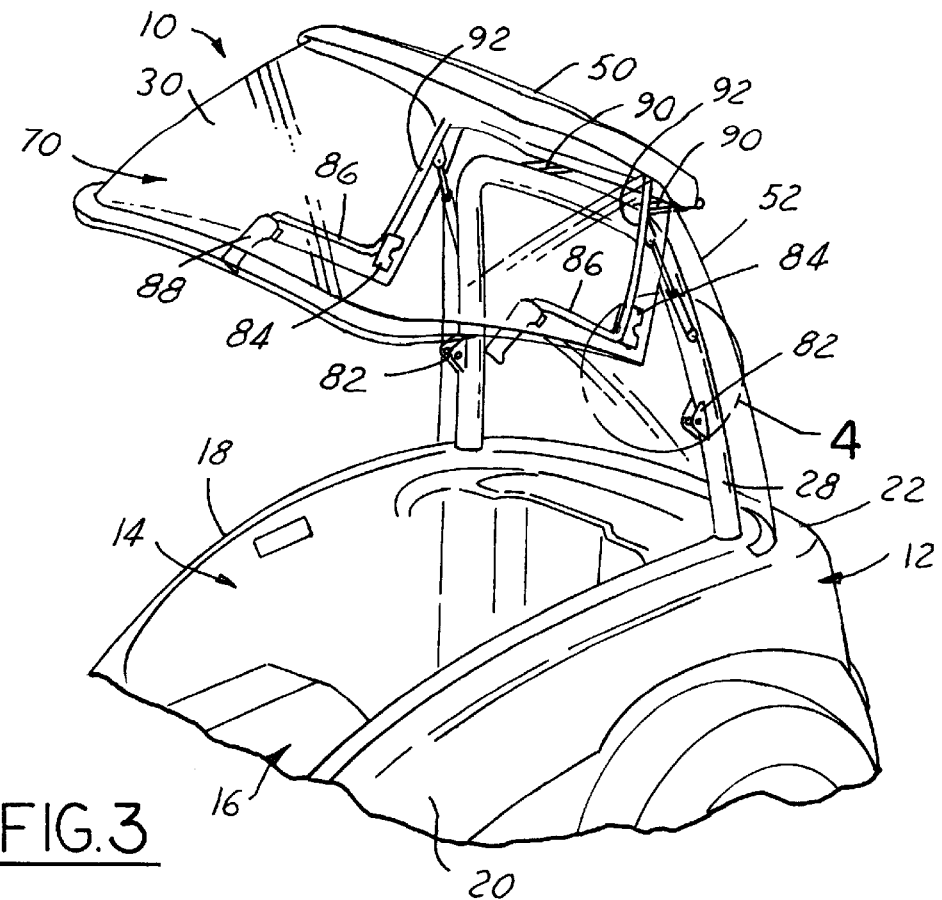
FIG. 3 is a perspective view in accordance with a preferred embodiment of the present invention.
Figure 4:
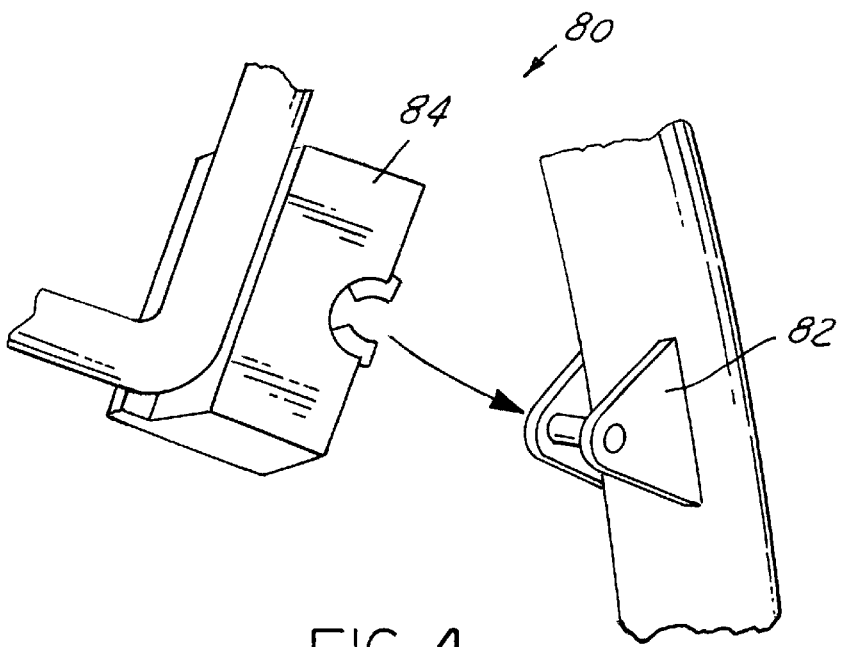
FIG. 4 is a schematic illustration of a latch for retaining an environmental enclosure module in a closed position in accordance with a preferred embodiment of the present invention.

Referring now to FIGS. 1 through 3, which illustrate an environmental enclosure device 10 in accordance with the present invention. The environmental enclosure device 10 is preferably intended for use with a personal mobility vehicle 12, such as shown in the drawings. However, it will be understood that that the preferred environmental enclosure device 10 can be utilized with a variety of other modes of transportation including all mobility vehicles, boats, and the like.

As shown, the mobility vehicle 12 has a passenger compartment 14 formed therein. The passenger compartment 14 is preferably defined by open front portion 16, a pair of opposing side portions, 18, 20, and a back portion 22. The open front portion 16 allows easy entry and exit into the passenger compartment 14. The passenger compartment 14 preferably has a seat 24 secured therein. The seat 24 is preferably a comfort seat that can recline as desired. However, as shown in FIG. 2, the passenger compartment 14 may also accommodate a wheelchair 26 or other mobility assistance device such that the physically handicapped, the elderly, or those that need assistance can utilize the mobility vehicle 12 to interface with the outdoors.

The vehicle 12 also preferably includes a roll bar structure 28, or 'B' pillar structure in the nomenclature familiar to those skilled in the art of automotive design, which preferably supports the environmental enclosure device 10 on the vehicle 12. The environmental enclosure device 10 provides a secure wrapped design windshield having a front portion 30 and a pair of opposing side portion 32, 34. The front portion 30 and the pair of opposing side portions 32, 34 are preferably constructed of a single integral piece, however, it will be understood that they may be constructed of multiple independent pieces and with respective supporting methods. The front portion 30 and the pair of opposing side portions 32, 34 are preferably constructed of a transparent material, such a plastic or glass. As will be understood, these portions 30, 32, 34 can also be tinted to provide protection from the sun.

The front portion 30 and the pair of opposing side portion 32, 34 each have a respective upper portion 36, 38, 40 and a respective lower portion 42, 44, 46. The upper portion 36 of the front portion 30 and the upper portions 38, 40 of each of the opposing side portions 32, 34 are secured to a roof portion 50. The roof portion 50 is pivotally attached to the roll bar 28. The front portion 30 and the pair of opposing side portion 32, 34 extend downwardly toward the vehicle 12. However, the lower portions 42, 44, 46 terminate at a height substantially above the vehicle 12. Specifically, the lower portion 42 is located at a height substantially above the open front 16. Similarly, the lower portion 44 is located at a height substantially above the side portion 18 and the lower portion 46 is located at a height substantially above the side portion 20 of the vehicle 12.

This configuration allows air movement under the roof portion 50 and the windshield resulting in operator interaction with the fresh air elements of the outdoors, while at the same time shielding the operator from direct rain, light rain and the larger effects of the wind. Also, for those who are susceptible to sunburn due to the adverse affects from the sun, the environmental enclosure device 10 can protect an occupant from direct exposure to the sun. In this case, the front portion 30 and the side portions 32, 34 can be treated with a uv blocker or otherwise be configured to have a higher spf protection rating.

The environmental enclosure device 10 also preferably includes a rear transparent portion 52 that wraps behind the operator to provide protection to the operator's back while not obstructing the operator's forward and peripheral interface with the outdoors. The rear transparent portion 52 preferably has an upper portion 54 that is secured to an upper structure secured to the roll bar 28 and a lower portion 56 which is sealingly secured to the back portion 22 of the vehicle 12. The rear transparent portion 52 may or may not also be sealingly secured at either side 58, 60 to roll bar 28. It will be understood that the rear transparent portion can be constructed of a variety of materials and can take on a variety of different configurations.

FIGS. 1 and 2 illustrate the environmental enclosure device 10 in a closed or down position in accordance with the present invention. The environmental enclosure device 10 is preferably pivotable from the closed position to an open position. In the embodiment shown in FIG. 3, a canopy portion 70, which consists of the roof portion 50, the front portion 30 and the opposing side portions 32, 34 can be pivoted between a closed position providing a vehicle operation position and weather protection to an occupant in the passenger compartment and an open position providing an occupant an open unobstructed interface with the environment while retaining a portion of the weather protection capability. By pivoting the canopy portion 70 to an open position, an opening is provided for ease of entry to and exit from the passenger compartment 14 of the vehicle. The canopy portion 70 being in the raised or open position during parked use of the vehicle 12 is optimal for relaxation, observing the environment, for talking with other people, or a variety of other purposes. It is understood that the canopy portion 70 can also have a mechanical extension to provide sun blocking protection for an occupant when it is in the open position or that the structure of canopy portion 70 can also provide simple support for a thrown sun curtain or fabric awning.

The canopy portion 70 is preferably releasably secured to the roll bar 28 by a latch mechanism 80. The latch mechanism 80 includes a latch portion 82, which is secured to roll bar 28 and a corresponding locking engagement portion 84 that is attached to the canopy portion 70. The locking engagement portion 84 is preferably secured to a respective grab bar 86, which is secured to the inner side of each of the opposing side portions 32, 34 and the roof portion 50. The engagement portion 84 is preferably actuated such that by pulling on a trigger portion 88 of each of the grab bars 86 such that the respective locking engagement portions 84 will become detached from their respective latch portions 82 allowing the canopy portion 70 to pivot to an open position.

The roof portion 50 preferably includes a hinge portion 90 located at a rear portion thereof which hingeably secures the roof portion 50 to the roll bar 28. The rearwardly extending position of the hinge portion 90 is preferably intended to allow raising of the canopy portion 70 such that only a minimum angle of opening is required to provide access and/or an open viewing situation when the vehicle 12 is parked. The canopy portion 70 is preferably maintained in an open position by a gas assist strut 92. However, it will be understood that a spring arrangement may utilized instead of or in connection with the gas assist strut to hold the canopy portion 70 open. Moreover, power activation for opening and closing the canopy portion 70 and other suitable devices may be utilized to hold the canopy portion 70 in an open position as well as to latch it to vehicle 12.

The canopy portion 70 together with the grab bars 86 can be readily removable and installable in an manner either requiring or not requiring tools. Similarly, the rear transparent portion 52 can also be readily removable and installable. This allows the vehicle 12 to be readily used as either an open vehicle or a weather shielded vehicle. Additionally, the canopy portion 70 also can include a rain gutter 94 to control rain runoff from the canopy portion 70 and prevent rain from dripping or draining into the passenger compartment 16. Further, the canopy portion can extend all the way down and sealingly contact the vehicle on the sides so that at least a portion of the front portion remains open or exposed to the outdoors or, alternatively, to provide a completely sealed passenger compartment. As will also be understood, the canopy portion 70 can be utilized with a vehicle having a shorter roll bar 28, shortened rear glass portion 52, and lowered seating position, such that said canopy portion effectively seals the vehicle's primary body panels thus effectuating a further weather shielding capability.

Figure 5:
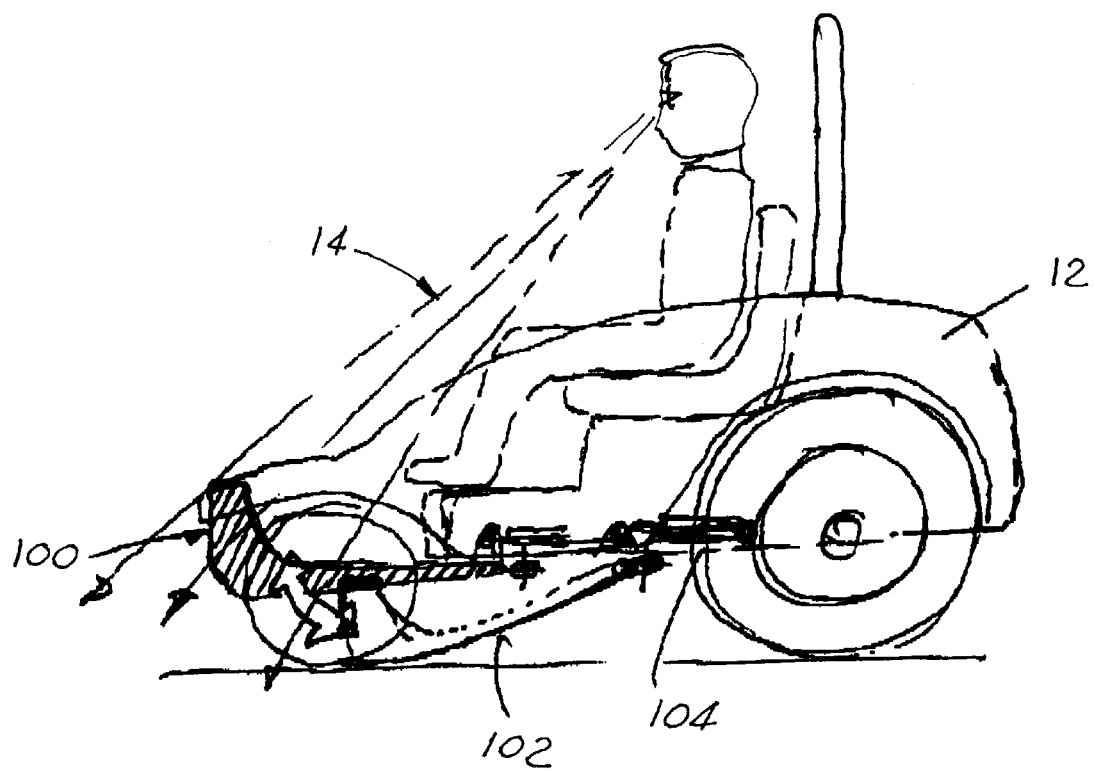
FIG. 5 is a schematic illustration of a floor closure portion for a vehicle desiring environmental enclosure in accordance with a preferred embodiment of the present invention.

The preferred vehicle 12 has an open front 16, which can leave the operator exposed to the elements. Accordingly, as shown in FIG. 5, the mobility vehicle 12 preferably includes a weather and road splash protection device 100 that at least substantially closes off the open area in the lower area in front of, and beneath the operator after they have been positioned within the passenger compartment 14 of the vehicle 12.

The weather and road splash protection device 100 preferably includes a floor closure panel 102. The floor closure panel 102 is moveable between a closed position where it is extended and generally providing parallel clearance to the ground and an open position where it is lowered and from beneath the passenger compartment 14 of the vehicle 12. The movement of the floor closure panel 102 is controlled by a floor panel actuator 104. The actuator 104 is preferably also in communication with the controls of the vehicle such that an operator can control the movement of the floor closure panel 102. It is understood that the floor panel actuation may also be performed manually or by other power activation.

In operation, to move the floor closure panel 102 away from the closed position, an operator activates the floor panel actuator 104. The floor panel actuator which controls a linkage system preferably slides and/or pivotably moves the floor closure panel rearwardly and downwardly.

The advantage of the disclosed environmental enclosure device 10 is the optimal interface with nature during operation of the vehicle 12, while also providing protection from direct contact with weather elements, such as road splash from rain or snow. The disclosed design is also of simple construction, is of lighter weight, and requires little sealing, when compared to a full weather enclosure design.

While a preferred embodiment of the present invention has been described so as to enable one skilled in the art to practice the present invention, it is to be understood that variations and modifications may be employed without departing from the purview and intent of the present invention, as defined in the following claims. Accordingly, the preceding description is intended to be exemplary and should not be used to limit the scope of the invention. The scope of the invention should be determined only by reference to the following claims.

What is claimed is:

1. An environmental enclosure device for a vehicle, the vehicle having a passenger compartment therein for receipt of an occupant, comprising:
   a roof portion disposed substantially over the passenger compartment to protect the occupant located therein from undesirable weather elements; and
   at least one transparent portion extending downwardly from said roof portion toward said vehicle such tat an opening remains between the vehicle and a bottom edge of said transparent portion to allow at least a front portion of the passenger compartment to be exposed to the outdoors while the enclosure device is in a closed position;
   wherein the device is pivotable between said closed position and an open position.

2. The device of claim 1, further comprising:
   a lower floor portion lying below the passenger compartment, said lower floor portion configured such that an opening remains between said lower floor portion and said bottom edge of said at least one transparent portion to allow the occupant to interface with the outdoors while the vehicle is being operated.

3. The device of claim 2, wherein said lower floor portion is moveably secured to the vehicle and moveable between a raised position and a lowered position.

4. The device of claim 1, wherein the vehicle has an open front to allow the occupant to readily enter and exit the vehicle while the device is in an open position.

5. The device of claim 1, wherein said at least one transparent portion is a front windshield portion.

6. The device of claim 1, wherein said at least one transparent portion is a single piece extending around the passenger compartment to leave the front and the sides of the passenger compartment open for the occupant between the vehicle and said bottom edge of said at least one transparent portion.

7. The device of claim 1, wherein said roof portion is pivotally secured to a roll bar of the vehicle.

8. The device of claim 1, further comprising
   at least one grab handle to allow the occupant to pivot the device between said closed position and said open position.

9. The device of claim 7, wherein said roll bar includes at least one locking latch thereon to secure the device thereto.

10. The device of claim 1, wherein said lower floor portion is supported by the mobility.

11. An environmental enclosure device for a mobility vehicle comprising:
    a pivotable canopy portion secured to the mobility vehicle, said canopy portion including a roof portion that lies over a passenger compartment and a windshield portion that extends generally downwardly from said roof portion and wraps around said passenger compartment, an air gap being formed between the vehicle and a bottom edge of said windshield portion to allow an operator to interface with the outdoors while the vehicle is operating and said pivotable canopy portion is in a closed position;

a latch mechanism for releasably securing said pivotable canopy portion to the vehicle to keep said canopy portion in said closed position; and a release mechanism for releasing said canopy portion from engagement with said latch mechanism to allow said canopy portion to pivot to an open position.

12. The device of claim 11, wherein said mobility vehicle has an open front.

13. The device of claim 11, wherein said canopy portion is hingeably secured on a roll bar of the mobility vehicle.

14. The device of claim 11, further comprising:

a lower floor portion secured to the mobility vehicle and moveable between a lowered position and a raised position.

15. The device of claim 11, wherein said canopy portion is maintained in said open position by at least one gas assist strut.

16. An environmental enclosure device for a vehicle, the vehicle having a passenger compartment therein for receipt of an occupant, comprising:

a roof portion disposed substantially over the passenger compartment to protect the occupant located therein from undesirable weather elements; and at least one transparent portion extending downwardly from said roof portion toward said vehicle such that an opening remains between the vehicle and a bottom edge of said transparent portion to allow at least a front portion of the passenger compartment to be exposed to the outdoors while the enclosure device is in a closed position;

wherein the vehicle has an open front portion to allow the occupant to readily enter and exit the vehicle while the device is in an open position.

17. The device of claim 16, further comprising:

a lower floor portion lying below the passenger compartment, said lower floor portion configured such that an opening remains between said lower floor portion and said bottom edge of said at least one transparent portion to allow the occupant to interface with the outdoors while the vehicle is being operated.

18. The device of claim 17, wherein said lower floor portion is moveably secured to the vehicle and is moveable between a raised position and a lowered position.

19. The device of claim 16, wherein the device is pivotable between said closed position and said open position.

20. The device of claim 16, wherein the device includes a plurality of transparent portions such that the entire periphery of the passenger compartment is shielded for the elements.

21. The device of claim 16, wherein said at least one transparent portion is a single piece extending around the passenger compartment to leave the front and the sides of the passenger compartment open for the occupant between the vehicle and said bottom edge of said at least one transparent portion.

22. The device of claim 16, wherein said roof portion is pivotally secured to a roll bar, which is secured to either side of the vehicle.

23. The device of claim 16, further comprising:

a rain gutter disposed adjacent a lower periphery of said at least one transparent portion to assist in channeling rain away from the passenger compartment of the vehicle.

24. An environmental enclosure device for a vehicle, the vehicle having a passenger compartment therein for receipt of an occupant, comprising:

a roof portion disposed substantially over the passenger compartment to protect the occupant located therein from undesirable weather elements; and at least one transparent portion extending downwardly from said roof portion toward said vehicle and extending around said passenger compartment covering a front portion and at least a portion of each of said opposing side portions to leave an opening between the vehicle and a bottom edge of said transparent portion to allow a front portion and each of the side portions of the passenger compartment to be exposed to the outdoors and at least partially protected from adverse weather conditions while the enclosure device is in a closed position.

25. The device of claim 24, further comprising:

a lower floor portion lying below the passenger compartment, said lower floor portion configured such that an opening remains between said lower floor portion and said bottom edge of said at least one transparent portion to allow the occupant to interface with the outdoors while the vehicle is being operated.

26. The device of claim 25, wherein said lower floor portion is moveably secured to the vehicle and is moveable between a raised position and a lowered position.

27. The device of claim 24, wherein the device is pivotable between said closed position and an open position.

28. The device of claim 27, wherein the vehicle has an open front portion to allow the occupant to enter and exit the vehicle when the device is in said open position.

29. The device of claim 24, wherein the device includes a plurality of transparent portions such that the entire periphery of the passenger compartment is shielded for the elements.

30. The device of claim 24, wherein said at least one transparent portion is a single piece extending around the passenger compartment to leave the front and the sides of the passenger compartment open for the occupant between the vehicle and said bottom edge of said at least one transparent portion.

31. The device of claim 24, wherein said roof portion is pivotally secured to a roll bar, which is secured to either side of the vehicle.

32. The device of claim 24, further comprising:

a rain gutter disposed adjacent a lower periphery of said at least one transparent portion to assist in channeling rain away from the passenger compartment of the vehicle.

* * * * *